(12) United States Patent
Alam

(10) Patent No.: US 9,558,547 B2
(45) Date of Patent: Jan. 31, 2017

(54) SYSTEM AND METHOD FOR DETERMINING WHETHER AN APPARATUS OR AN ASSEMBLY PROCESS IS ACCEPTABLE

(71) Applicant: The Boeing Company, Chicago, IL (US)

(72) Inventor: Munirul Alam, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 242 days.

(21) Appl. No.: 14/151,584

(22) Filed: Jan. 9, 2014

(65) Prior Publication Data
US 2015/0193925 A1 Jul. 9, 2015

(51) Int. Cl.
*G06K 9/00* (2006.01)
*G06T 7/00* (2006.01)

(52) U.S. Cl.
CPC ...... *G06T 7/001* (2013.01); *G06T 2207/10116* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 4,509,075 A * | 4/1985 | Simms | G06T 5/50 250/223 B |
| 4,589,140 A | 5/1986 | Bishop et al. | |
| 5,621,807 A * | 4/1997 | Eibert | G01S 17/89 356/3.16 |
| 5,982,362 A | 11/1999 | Crater et al. | |
| 6,041,132 A * | 3/2000 | Isaacs | G01N 23/046 378/21 |
| 6,529,620 B2 | 3/2003 | Thompson | |
| 6,542,076 B1 | 4/2003 | Joao | |
| 6,634,018 B2 * | 10/2003 | Randall | G03F 1/144 716/52 |
| 6,965,816 B2 | 11/2005 | Walker | |
| 7,068,301 B2 | 6/2006 | Thompson | |
| 7,486,760 B2 * | 2/2009 | Harding | G01N 23/20 378/7 |
| 7,505,605 B2 | 3/2009 | Rhoads et al. | |

(Continued)

FOREIGN PATENT DOCUMENTS

| | | |
|---|---|---|
| DE | 3611125 | 10/1987 |
| GB | 2398771 | 9/2004 |

(Continued)

OTHER PUBLICATIONS

Image registration error—Quality, Purdue e-Pubs, C.D. McGillem et al., 1975, pp. 3A-30-3A-37.*

(Continued)

*Primary Examiner* — Jayesh A Patel

(57) ABSTRACT

An apparatus is scanned to obtain a 3-dimensional image of the apparatus. A 2-dimensional cross-sectional image for a section of the 3-dimensional image is generated using a processor. The 2-dimensional cross-sectional image is compared with the processor to a preferred 2-dimensional cross-sectional image or to preferred dimensions for the 2-dimensional cross-sectional image. The processor determines if the apparatus or the process for making the apparatus is acceptable based on the comparison.

11 Claims, 9 Drawing Sheets

(56) References Cited

U.S. PATENT DOCUMENTS

| | | |
|---|---|---|
| 7,593,564 B2 | 9/2009 | Obara et al. |
| 7,675,541 B2 | 3/2010 | Kondo |
| 7,734,102 B2 * | 6/2010 | Bergeron ............... G01N 23/04 378/57 |
| 8,041,103 B2 | 10/2011 | Kulkarni et al. |
| 8,248,595 B2 | 8/2012 | Ochiai et al. |
| 8,340,245 B2 * | 12/2012 | Herranz ............... G01N 23/04 378/4 |
| 8,824,731 B2 * | 9/2014 | Maggiore ............... G06T 7/001 382/103 |
| 2003/0081720 A1 * | 5/2003 | Swift ............... G01N 23/04 378/41 |
| 2003/0215128 A1 | 11/2003 | Thompson |
| 2005/0157848 A1 | 7/2005 | Miyauchi et al. |
| 2005/0190881 A1 * | 9/2005 | Obata ............... G01N 23/20016 378/87 |
| 2006/0119704 A1 | 6/2006 | Buchheit |
| 2007/0127800 A1 * | 6/2007 | Coenen ............... G06T 7/0081 382/128 |
| 2007/0145308 A1 | 6/2007 | Kemp |
| 2007/0288219 A1 | 12/2007 | Zafar et al. |
| 2008/0059665 A1 * | 3/2008 | Cheng ............... H04N 19/503 710/53 |
| 2008/0204553 A1 | 8/2008 | Thompson |
| 2008/0205686 A1 | 8/2008 | Tagami et al. |
| 2010/0220910 A1 * | 9/2010 | Kaucic ............... G06T 7/001 382/131 |
| 2011/0255769 A1 * | 10/2011 | Galuschki ............. H05K 13/00 382/141 |

FOREIGN PATENT DOCUMENTS

| | | | |
|---|---|---|---|
| GB | 2398771 A * | 9/2004 | ......... B64D 45/0005 |
| WO | WO 03059789 | 7/2003 | |

OTHER PUBLICATIONS

Process capability and statistical quality control,Technical note seven, Oct. 27, 2011, pp. 300-321.*
International Search Report dated Mar. 9, 2009 for UK Application No. GB0820033.9, 8 pages.
Extraction Project Report dated Nov. 27, 2007 by Gerrod Andresen, 4 pages.
ATS SmartVision PC-based Vision system web page: http://www.atsautomation.com/automation/automationtech/st_smartvision.asp, Dated Aug. 25, 2008, containing 3 pages.
ThomasNet Video Inspection Systems web page: http://www.thomasnet.com/products/video-inspection-systems-91953661-1.html, dated Aug. 25, 2008, containing 3 pages.

* cited by examiner

SYSTEM AND METHOD FOR DETERMINING WHETHER AN APPARATUS OR AN ASSEMBLY PROCESS IS ACCEPTABLE

FIELD OF THE DISCLOSURE

This disclosure relates to a system and method for determining whether an apparatus or an assembly process is acceptable.

BACKGROUND

Many present systems and methods for inspection of apparatus or for evaluating an assembly process rely on manual inspection to determine whether the apparatus or the assembly process is acceptable. This can be time-consuming, can increase the potential for error, may be tiring, and may be costly. Other systems and methods for inspection of apparatus or for evaluating an assembly process may vary but may contain one or more additional issues.

A system and method is needed for the inspection of apparatus or for evaluating an assembly process to determine whether the apparatus or the assembly process is acceptable while overcoming one or more issues of one or more of the present systems or methods.

SUMMARY

In one embodiment, a method for determining whether an apparatus is acceptable is disclosed. In one step, an apparatus is scanned to obtain a 3-dimensional image of the apparatus. In another step, a 2-dimensional cross-sectional image for a section of the 3-dimensional image is generated using a processor. In yet another step, the 2-dimensional cross-sectional image is compared with the processor to a preferred 2-dimensional cross-sectional image or to preferred dimensions for the 2-dimensional cross-sectional image. In another step, the processor determines if the apparatus is acceptable based on the comparison.

In another embodiment, a method for determining whether an assembly process is acceptable is disclosed. In one step, an assembly is X-Ray scanned to obtain 2-dimensional image data of the assembly. In another step, a 3-dimensional image of the assembly is generated using a processor and a geometry processing tool. In yet another step, a 2-dimensional cross-sectional image for a section of the 3-dimensional image is generated using the processor. In still another step, the 2-dimensional cross-sectional image is compared using the processor to digital model assembly data which includes nominal dimensions and tolerances for one or more features of the assembly. In yet another step, the processor determines a process capability index based on the nominal dimensions and tolerances to determine if the assembly process is acceptable if the process capability index is above a predetermined threshold, or unacceptable if the process capability index is below the predetermined threshold.

In still another embodiment, a system for determining whether an assembly process is acceptable is disclosed. The system includes an X-Ray imaging device, a processor, and a memory. The X-Ray imaging device is configured to acquire 2-dimensional image data of an assembly. The processor is in electronic communication with the X-Ray imaging device. The memory is in electronic communication with the processor. The memory includes a computer tomography application executable by the processor to generate a 3-dimensional image of the assembly based on the 2-dimensional image data from the X-Ray imaging device. The memory further includes programming code executable by the processor to generate a 2-dimensional cross-sectional image for a section of the 3-dimensional image of the assembly. The programming code is configured to compare the 2-dimensional cross-sectional image to a preferred 2-dimensional cross-sectional image or to preferred dimensions for the 2-dimensional cross-sectional image; and to determine a process capability index based on nominal dimensions and tolerances to determine whether the assembly process is acceptable based on whether the process capability index is above a predetermined threshold.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
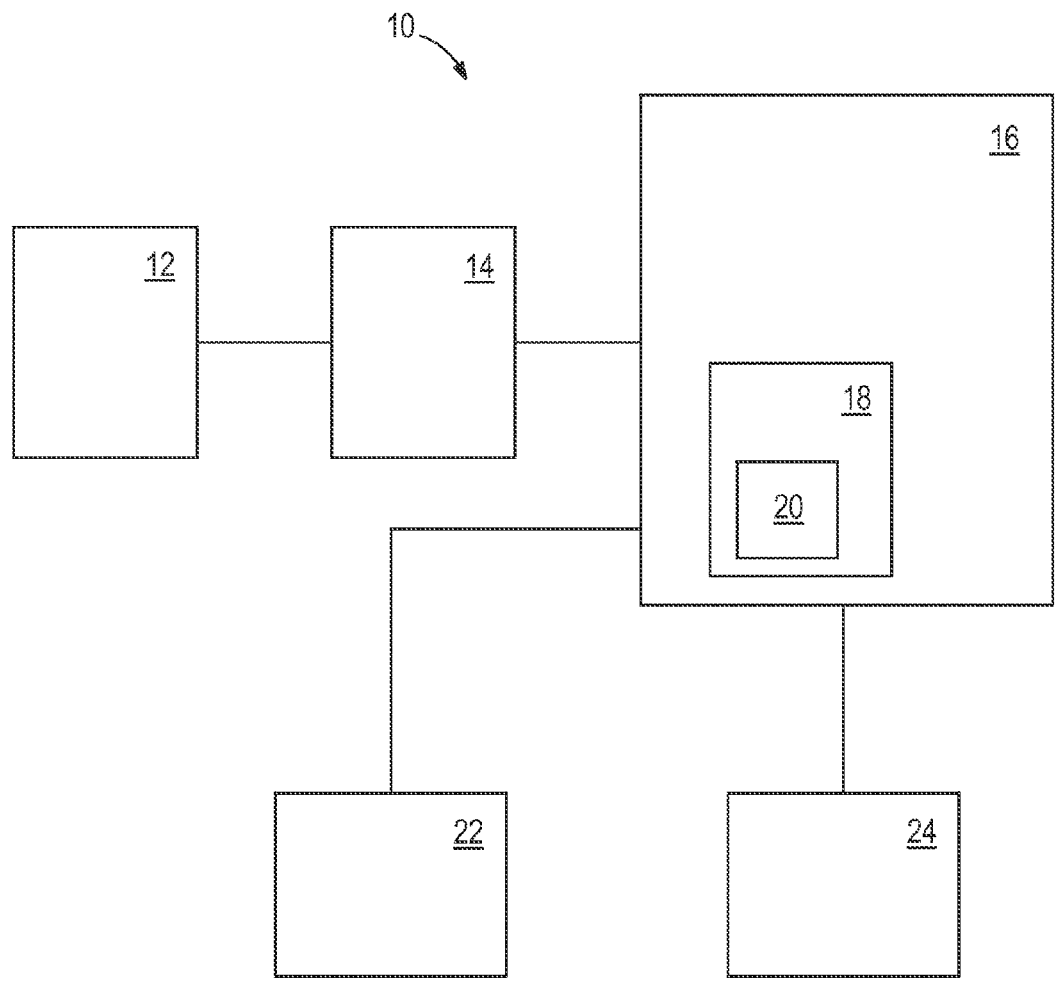
FIG. 1 illustrates a box diagram for one embodiment of a system for determining whether an apparatus is acceptable.

FIG. 1 illustrates a box diagram for one embodiment of a system 10 for determining whether an apparatus 12 is acceptable. The system 10 includes an imaging device 14, a processor 16, a memory 18, programming code 20, an input device 22, and an output device 24. The apparatus 12 may comprise an apparatus which was manufactured or assembled. In other embodiments the apparatus 12 may vary. The imaging device 14 is configured to take a 3-dimensional image of the apparatus 12. In one embodiment the imaging device 14 comprises an X-Ray device (or X-Ray scanning device) configured to acquire 2-dimensional image data of the apparatus 12 which is converted into the 3-dimensional image of the apparatus 12 using a computer tomography application stored in the memory 18 and executed by the processor 16. In other embodiments the imaging device 14 may vary.

The processor 16 is in electronic communication with the imaging device 14, the memory 18, the input device 22, and the output device 24. The programming code 20 is stored in the memory 18 for execution by the processor 16. The programming code 20 is configured to generate a 2-dimensional cross-sectional image for a section of the 3-dimensional image of the apparatus 12 and to store the 2-dimensional cross-sectional image in the memory 18. In one embodiment the section of the 3-dimensional image of the apparatus 12 is selected to correspond to digital model assembly data stored in the memory 18 which includes nominal dimensions and tolerances for one or more features of the apparatus 12. Nominal dimensions are defined herein to comprise a target for design specifications. Tolerances are defined herein to be an allowance above or below the nominal dimensions. The programming code 20 is configured to compare the 2-dimensional cross-sectional image to a preferred 2-dimensional cross-sectional image stored in the memory 18 or to preferred dimensions for the 2-dimensional cross-sectional image stored in the memory 18. In one embodiment the programming code 20 is configured to compare the 2-dimensional cross-sectional image to digital model assembly data stored in the memory 18 which includes the nominal dimensions and the tolerances for the one or more features of the apparatus 12. In one embodiment the programming code 20 is configured to overlay the 2-dimensional cross-sectional image with the preferred 2-dimensional cross-sectional image stored in the memory 18 which includes the nominal dimensions and the tolerances for the one or more features of the apparatus 12.

The programming code 20 is configured to determine if the apparatus 12 is acceptable based on the comparison. In one embodiment the programming code 20 is configured to determine that the apparatus 12 is acceptable if the 2-dimensional cross-sectional image stored in the memory 18 falls within the tolerances stored in the memory 18 and to determine that the apparatus 12 is unacceptable if the 2-dimensional cross-sectional image stored in the memory 18 falls outside the tolerances stored in the memory 18. In one embodiment the programming code 20 is configured to determine a process capability index based on the nominal dimensions and tolerances for the one or more features of the apparatus 12 to determine whether the assembly process is acceptable based on whether the process capability index is above a predetermined threshold. In one embodiment if the programming code 20 determines that the apparatus is unacceptable the programming code 20 may provide corrective action instructions to modify a method of manufacturing the apparatus 12 to produce an apparatus 12 and/or yield an assembly process which is determined to be acceptable by the programming code 20.

The input device 22 is configured to allow a user, a bar code reader, or a radio frequency identification receiver to input information regarding the apparatus 12 to the processor 16 for storage into the memory 18. The input device 22 may comprise a keyboard, a touchpad, a mouse, a bar code reader, a radio frequency identification receiver, or another type of input device. The programming code 20 may use the information inputted by the input device 22. The output device 24 is configured to output an indication as to whether the apparatus 12 is acceptable as determined by the processor 16. The output device 24 may comprise a display, an audio device, or another type of output device. In other embodiments one or more components of the system 10 may vary in type, number, or configuration, one or more components of the system 10 may not be used, or one or more additional components may be added to the system 10 to achieve varying functions.

Figure 2:
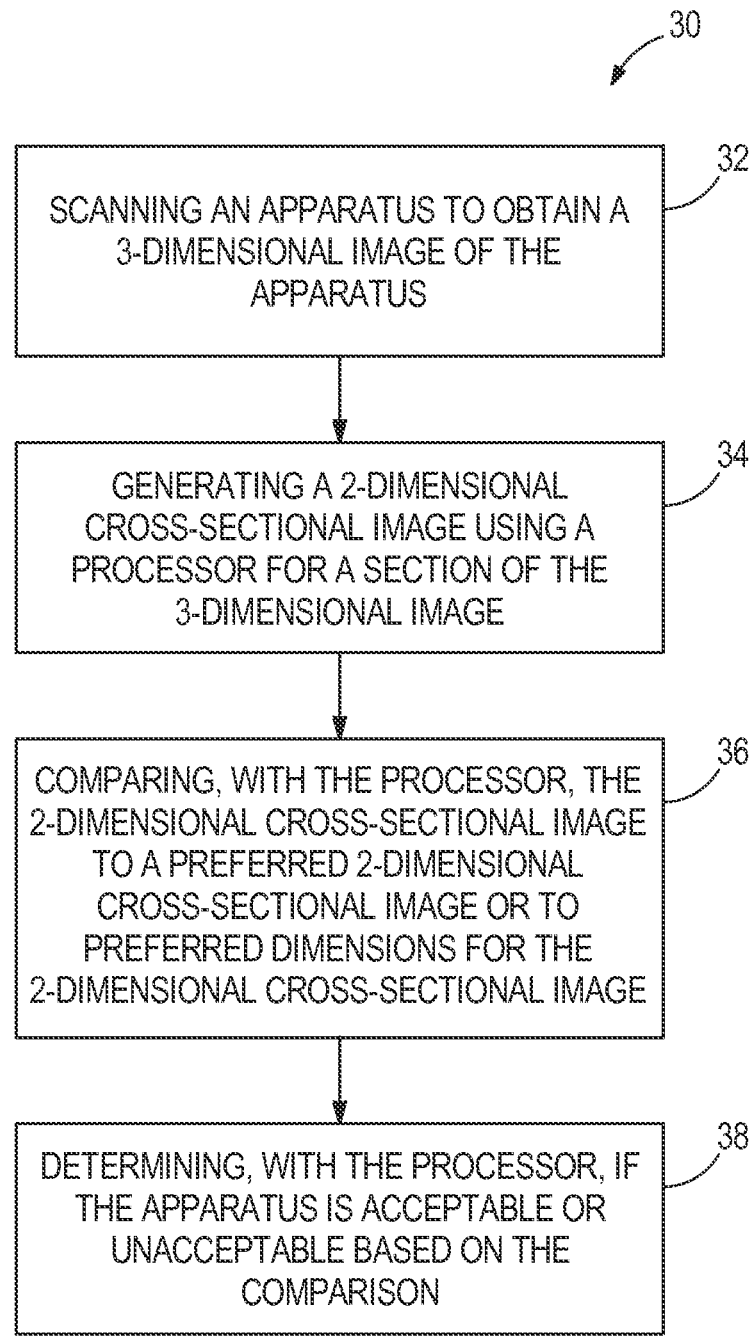
FIG. 2 is a flowchart of one embodiment of a method for determining whether an apparatus is acceptable.

FIG. 2 is a flowchart of one embodiment of a method 30 for determining whether an apparatus is acceptable. The method 30 may utilize the system 10 of FIG. 1. In other embodiments the method 30 may utilize systems having varying components. The apparatus may comprise an apparatus which was manufactured or assembled. In other embodiments the apparatus may vary. In step 32, the apparatus is scanned to obtain a 3-dimensional image of the apparatus. In one embodiment step 32 may comprise X-Ray scanning the apparatus to obtain 2-dimensional image data of the apparatus and generating a 3-dimensional image of the apparatus using a processor and a geometry processing tool such as a computer tomography application to digitally geometry process the 3-dimensional image. In other embodiments step 32 may utilize varying scanning devices or methods. In other embodiments step 32 may further vary.

In step 34, a 2-dimensional cross-sectional image is generated using the processor for a section of the 3-dimensional image. In one embodiment step 34 may comprise the section of the 3-dimensional image of the apparatus being selected to correspond to digital model assembly data stored in memory, in electronic communication with the processor, which includes nominal dimensions and tolerances for one or more features of the apparatus. Nominal dimensions are defined herein to comprise a target for design specifications. Tolerances are defined herein to be an allowance above or below the nominal dimensions. In other embodiments step 34 may vary. In step 36, the processor and programming code compares the 2-dimensional cross-sectional image to a preferred 2-dimensional cross-sectional image or to preferred dimensions for the 2-dimensional cross-sectional image. In one embodiment step 36 may comprise overlaying the 2-dimensional cross-sectional image with the preferred 2-dimensional cross-sectional image. In one embodiment step 36 may comprise comparing the 2-dimensional cross-sectional image to digital model assembly data which includes nominal dimensions and tolerances for one or more features of the apparatus. In other embodiments step 36 may vary.

In step 38, the processor and/or programming code determines if the apparatus is acceptable or unacceptable based on the comparison. In one embodiment step 38 may comprise the processor and/or programming code determining that the apparatus is acceptable if the 2-dimensional cross-sectional image falls within the tolerances and the processor determining that the apparatus is unacceptable if the 2-dimensional cross-sectional image falls outside the tolerances. In one embodiment step 38 may comprise the processor and/or programming code determining a process capability index based on feature dimensions derived from the 2-dimensional image and the nominal dimensions and the tolerances for the one or more features of one or more assemblies, to determine that the assembly process is acceptable if the process capability index falls above a predetermined threshold or to determine that the assembly process is unacceptable if the process capability index falls below the predetermined threshold. In one embodiment step 38 may comprise the processor and/or programming code accepting the assembly process if the processor determines that the process capability index is acceptable and the processor rejecting the assembly process if the processor determines that the process capability index is unacceptable. In one embodiment step 38 may comprise the processor modifying a method of manufacturing the apparatus if the processor determines that the apparatus is unacceptable so that the modified method of manufacturing the apparatus produces an apparatus which the processor determines to be acceptable. In other embodiments step 38 may vary. In still other embodiments one or more steps of the method 30 may be modified in substance or in order, one or more steps of the method may not be followed, or one or more additional steps may be added.

Figure 3:
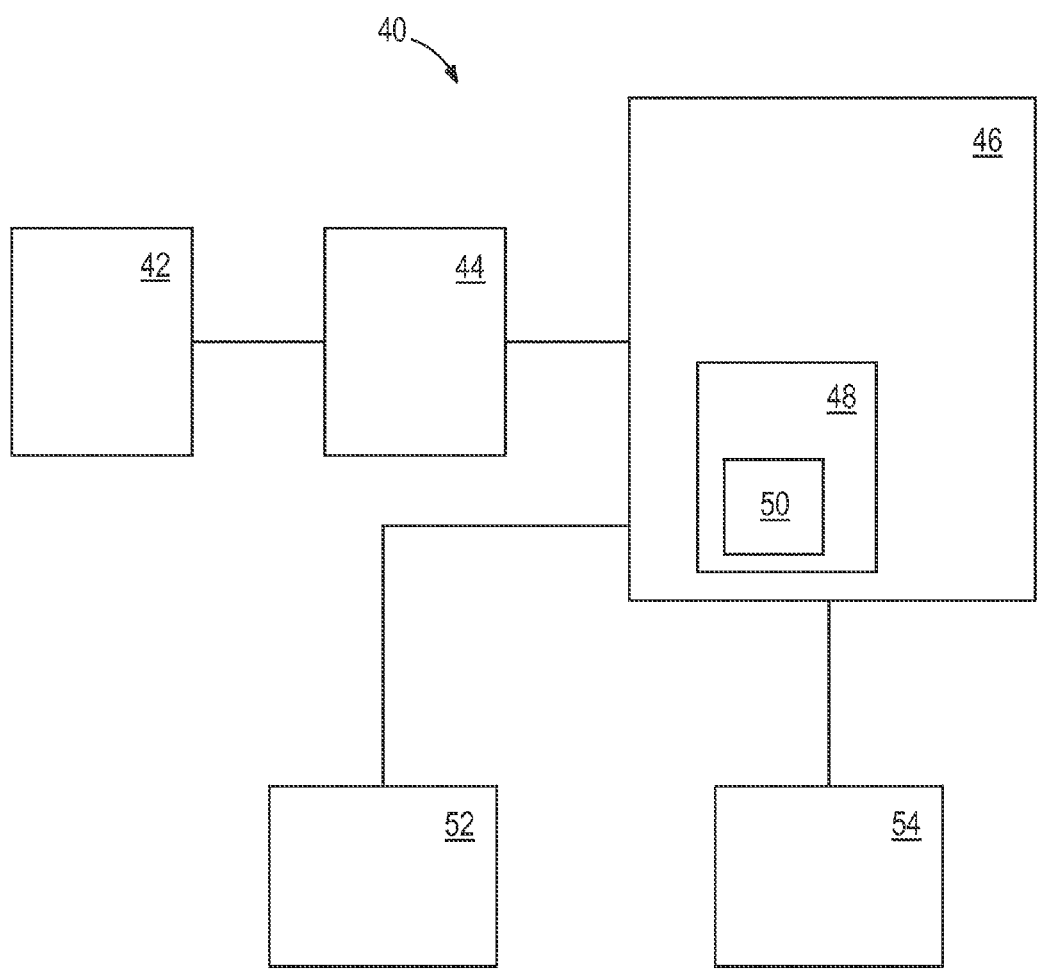
FIG. 3 illustrates a box diagram for one embodiment of a system for determining whether an assembly process for assembling an assembly is acceptable.

FIG. 3 illustrates a box diagram for one embodiment of a system 40 for determining whether an assembly process for assembling an assembly 42 is acceptable. The system 40 includes an imaging device 44, a processor 46, a memory 48, programming code 50, an input device 52, and an output device 54. The imaging device 44 is configured to take a 3-dimensional image of the assembly 42. In one embodiment the imaging device 44 comprises an X-Ray scanning device configured to acquire 2-dimensional image data of the assembly 42 which is converted into the 3-dimensional image of the assembly 42 using a computer tomography application stored in the memory 48 and executed by the processor 46. In other embodiments the imaging device 44 may vary.

Figure 9:
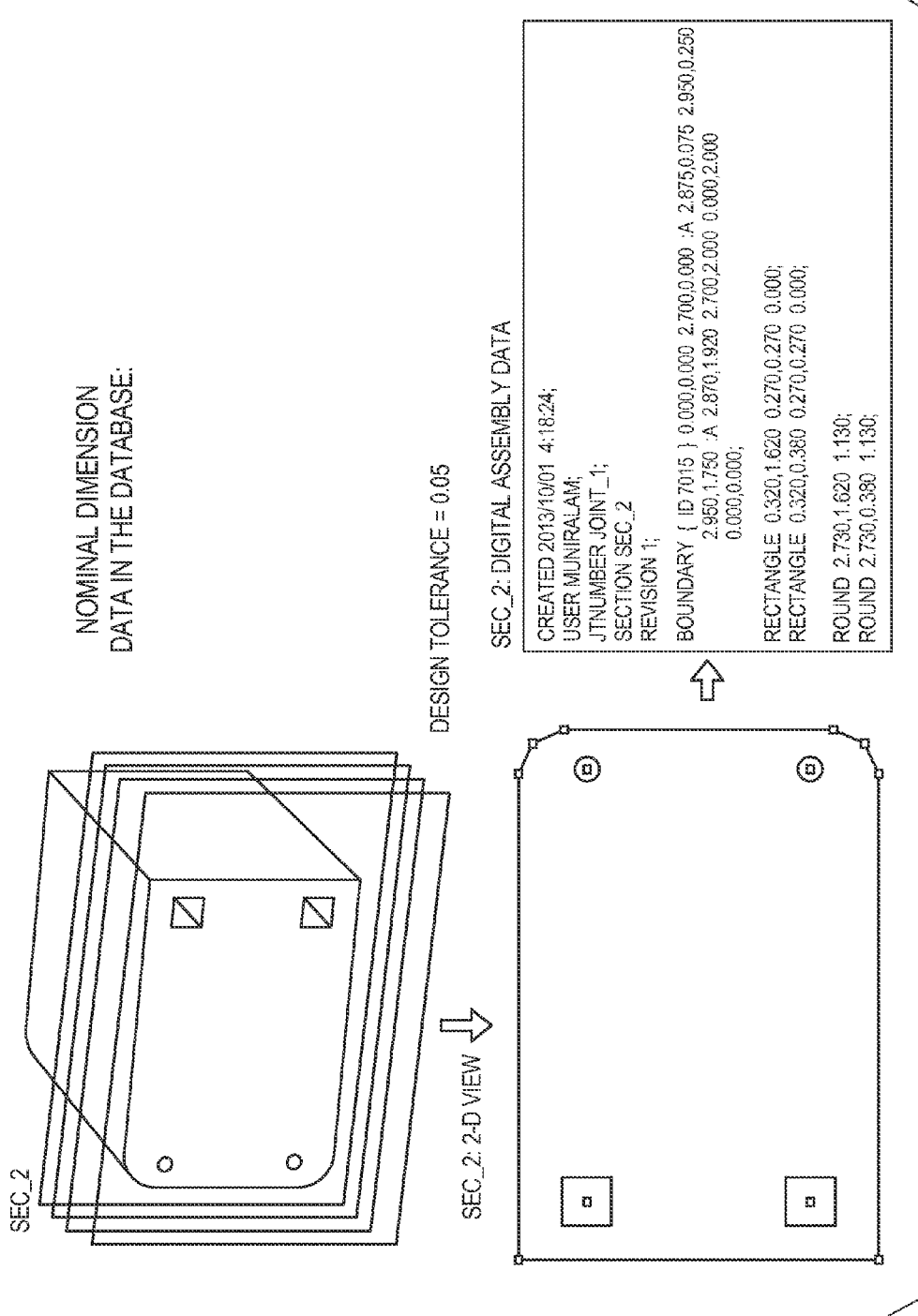
FIG. 9 is an illustration of another embodiment of a 2-dimensional cross-sectional image which was generated for a section of a 3-dimensional image of an exemplary assembly.
Figure 10:
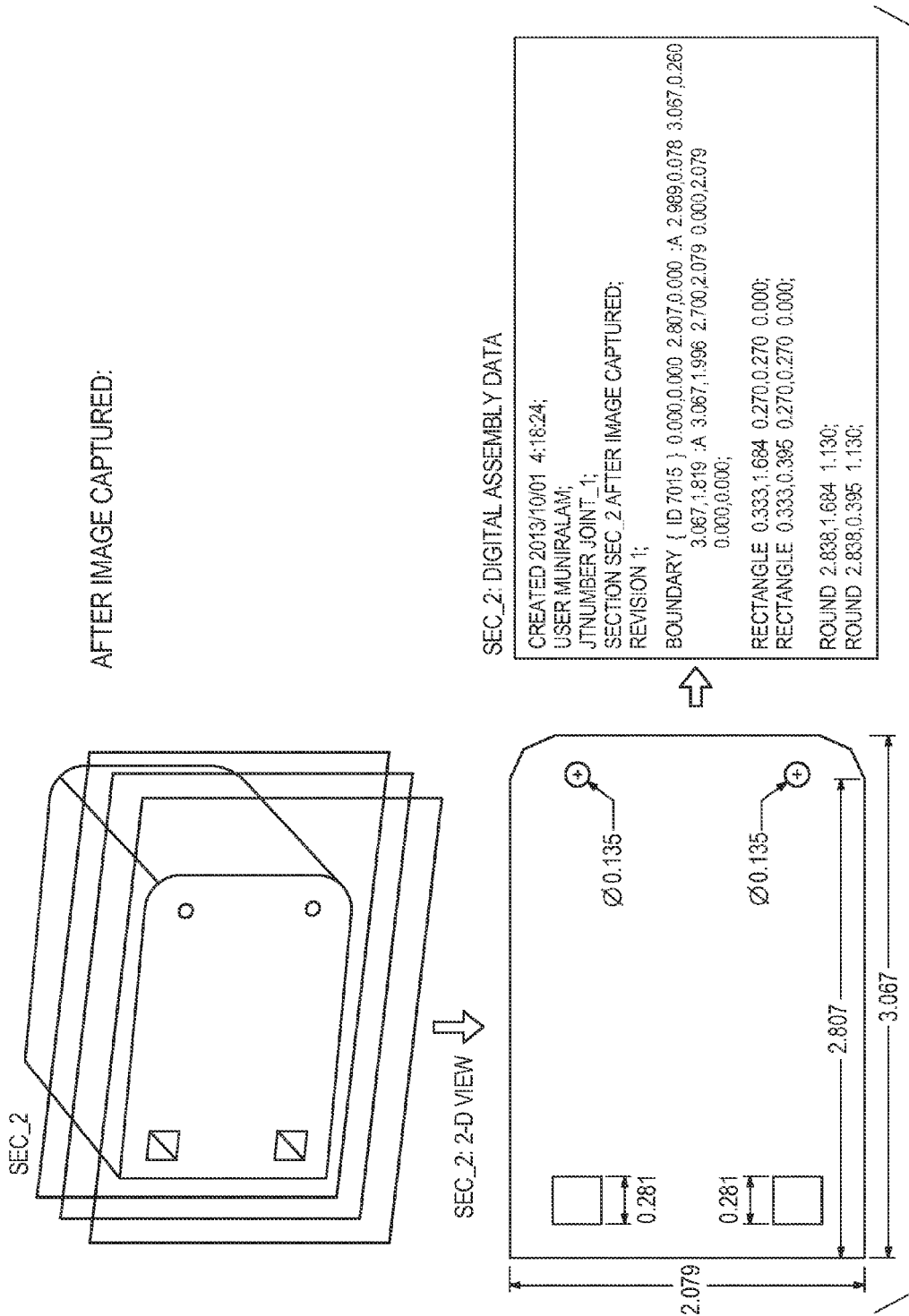
FIG. 10 is an illustration of another embodiment of a preferred 2-dimensional cross-sectional image for the 2-dimensional cross-sectional image of FIG. 9 which was obtained using digital assembly data.
Figure 11:
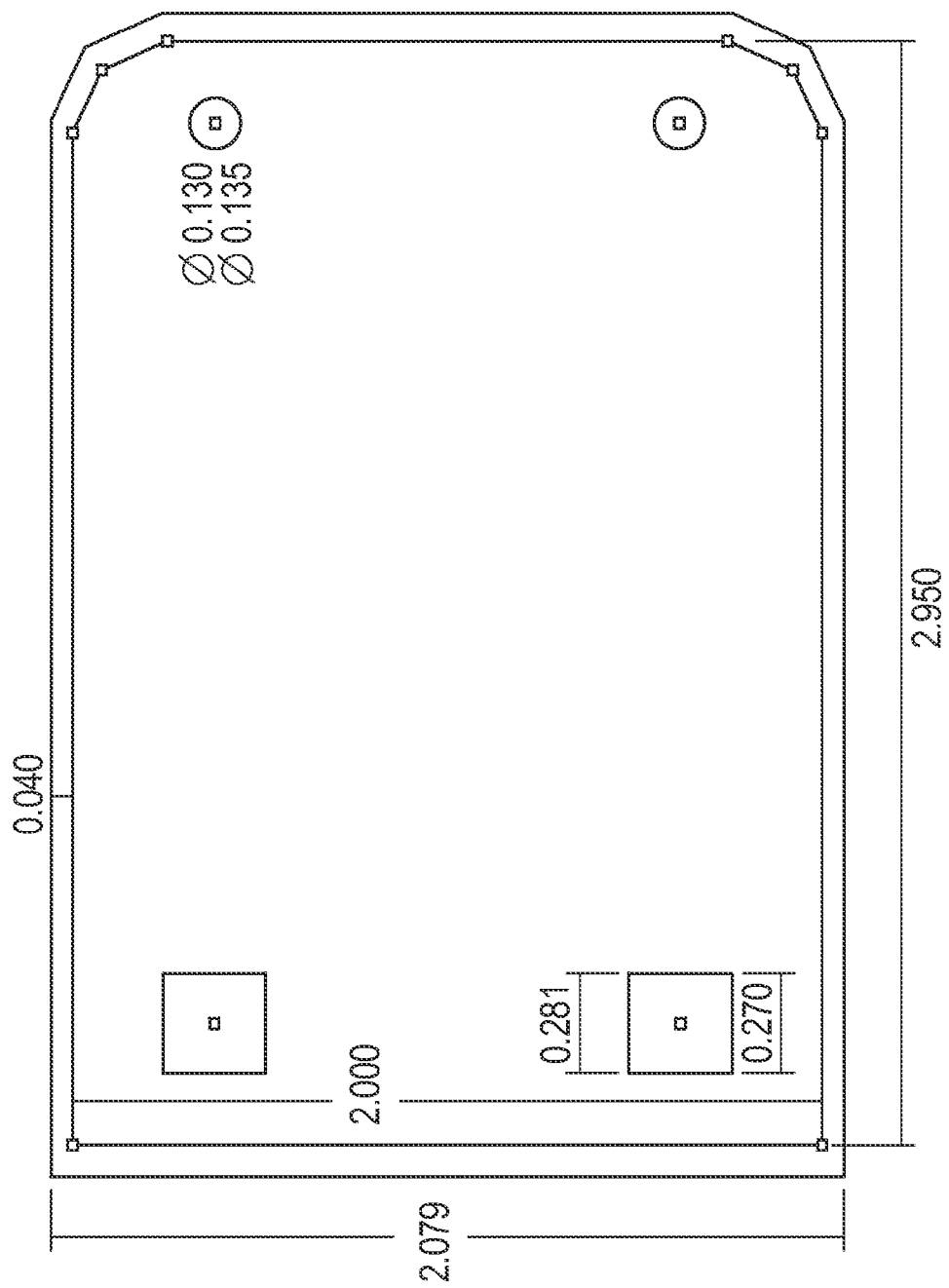
FIG. 11 is an illustration of another embodiment of a comparison or overlay of the 2-dimensional cross-sectional image of FIG. 9 relative to the preferred 2-dimensional cross-sectional image of FIG. 10 in order to determine whether the assembly process of assembling the assembly is acceptable or unacceptable.

The processor 46 is in electronic communication with the imaging device 44, the memory 48, the input device 52, and the output device 54. The programming code 50 is stored in the memory 48 for execution by the processor 46. The programming code 50 is configured to generate a 2-dimensional cross-sectional image for a section of the 3-dimensional image of the assembly 42 and to store the 2-dimensional cross-sectional image in the memory 48. In one embodiment the section of the 3-dimensional image of the assembly 42 is selected to correspond to digital model assembly data stored in the memory 48 which includes nominal dimensions and tolerances for one or more features of the assembly 42. Nominal dimensions are defined herein to comprise a target for design specifications. Tolerances are defined herein to be an allowance above or below the nominal dimensions. The programming code 50 is configured to compare the 2-dimensional cross-sectional image to a preferred 2-dimensional cross-sectional image stored in the memory 48 or to preferred dimensions for the 2-dimensional cross-sectional image stored in the memory 48. In one embodiment the programming code 50 is configured to compare the 2-dimensional cross-sectional image to digital model assembly data stored in the memory 48 which includes the nominal dimensions and the tolerances for the one or more features of the assembly 42. In one embodiment the programming code 50 is configured to overlay the 2-dimensional cross-sectional image with the preferred 2-dimensional cross-sectional image stored in the memory 48 which includes the nominal dimensions and the tolerances for the one or more features of the assembly 42. FIG. 11 is an illustration of another embodiment of a comparison or overlay of the 2-dimensional cross-sectional image of FIG. 9 relative to the preferred 2-dimensional cross-sectional image of FIG. 10 that includes nominal dimensions and tolerances, in order to determine whether the assembly process is acceptable or unacceptable.

The programming code 50 is configured to determine if the assembly 42 and hence the assembly process is acceptable based on the comparison. In one embodiment the programming code 50 is configured to determine that the assembly 42 and hence the assembly process is acceptable if the 2-dimensional cross-sectional image stored in the memory 48 falls within the tolerances stored in the memory 48 and to determine that the assembly 42 and hence the assembly process is unacceptable if the 2-dimensional cross-sectional image stored in the memory 48 falls outside the tolerances stored in the memory 48. In one embodiment the programming code 50 is configured to determine a process capability index based on the nominal dimensions and tolerances for the one or more features of the assembly 42 to determine whether the assembly process is acceptable based on whether the process capability index is above a predetermined threshold. The process capability index is defined herein as an index which denotes the ability of the process to meet the design specifications for a service or product.

In one embodiment a six sigma process capability index may be utilized. Dimensions of one or more features derived from the 2-dimensional cross-sectional images of one or more assemblies may be evaluated relative to the nominal dimensions and tolerances, and may be used to compute a standard of deviation for dimensions derived from one or more assemblies to determine a process capability index for evaluating the process capability of the assembly process. In one embodiment, the processor 46 may be configured to determine whether the assembly process is acceptable based on whether the process capability index, or Cpk value, is above a predetermined threshold. An assembly process may be acceptable where the process capability index or Cpk is greater than a predetermined threshold value of 1.0 or 1.333. The Cpk value of 1.333 or greater is considered to be an industry benchmark. This means that the process is contained within four standard deviations of the process specifications, and 64 non-conforming parts per million (ppm) are defected. The process capability index is a measurable property of a process to specification, expressed as a process capability index (Cpk). The output of this measurement is usually illustrated by a histogram along with calculations that predict how many parts will be produced from customer specifications based on the particular process implemented in order to determine whether the process will meet customer requirements, specifications, and product tolerances. The process capability index determines the extent to which the process will meet these requirements, specifications, and product tolerances. To determine the process capability index, the programming code is configured to compute for a given feature a mean value and standard of deviation for the feature dimensions derived from one or more assemblies. The programming code is further configured to calculate a Cpk value based on upper and lower tolerance limits, the mean and standard deviation values, according to standard equations for Cpk.

In other exemplary embodiments, the process capability index may measure the potential for the process to generate defective outputs relative to either upper or lower specifications for the process. In one embodiment the process capability index may measure the worst-case scenario for the process. In one embodiment a six sigma process capability index may be utilized.

In one embodiment if the programming code 50 determines that the assembly 42 and hence the assembly process is unacceptable the programming code 50 may communicate corrective action instructions to the output device 54 to modify the assembly process of manufacturing the assembly 42 to produce an assembly 42 which is determined to be acceptable by the programming code 50.

The input device 52 is configured to allow a user, a bar code reader, or a radio frequency identification receiver to input information regarding the assembly 42 or the assembly process to the processor 46 for storage into the memory 48. The input device 52 may comprise a keyboard, a touchpad, a mouse, a bar code reader, a radio frequency identification receiver, or another type of input device. The programming code 50 may use the information inputted by the input device 52. The output device 54 is configured to output an indication as to whether the assembly 42 or the assembly process is acceptable as determined by the processor 46. The output device 54 may comprise a display, an audio device, or another type of output device. In other embodiments one or more components of the system 40 may vary in type, number, or configuration, one or more components of the system 40 may not be used, or one or more additional components may be added to the system 40 to achieve varying functions.

Figure 4:
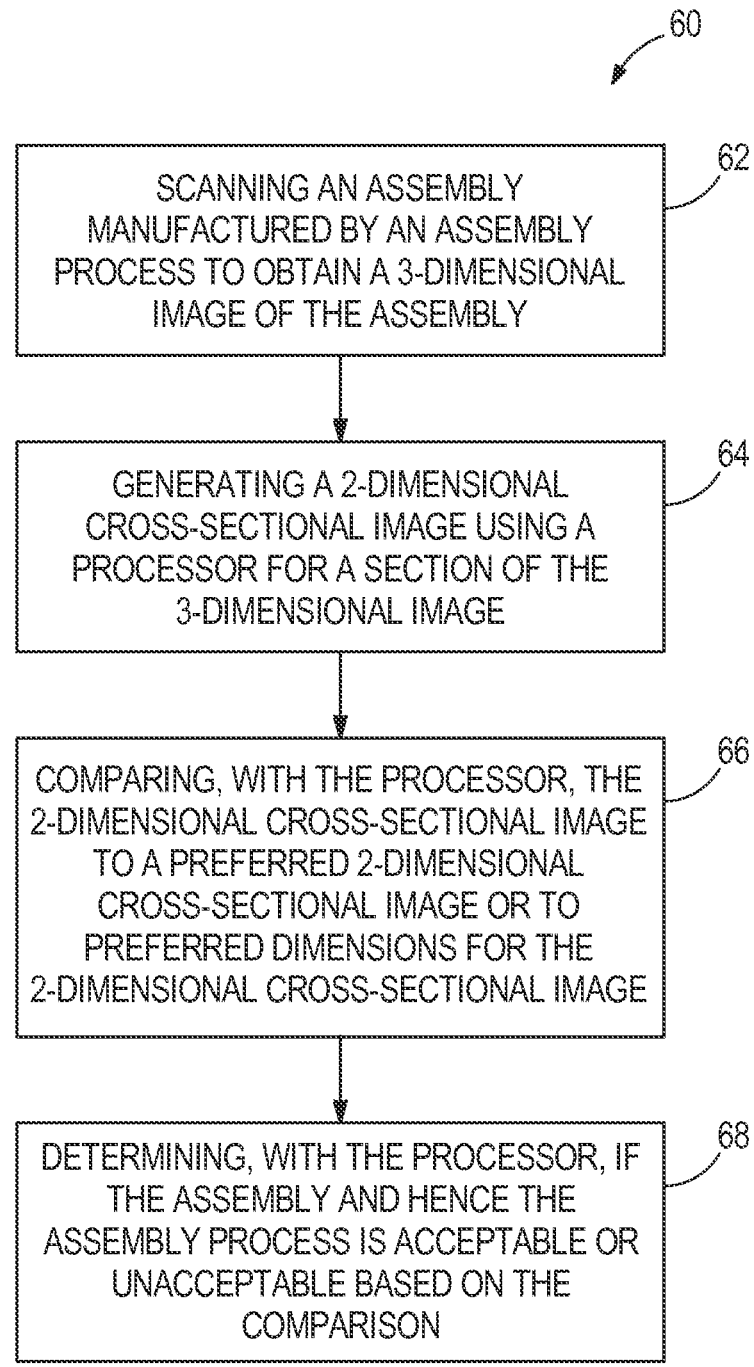
FIG. 4 is a flowchart of one embodiment of a method for determining whether an assembly process for manufacturing an assembly is acceptable.

FIG. 4 is a flowchart of one embodiment of a method 60 for determining whether an assembly process for manufacturing an assembly is acceptable. The method 60 may utilize the system 40 of FIG. 3. In other embodiments the method 60 may utilize systems having varying components. In step 62, the assembly manufactured by the assembly process is scanned to obtain a 3-dimensional image of the assembly. In one embodiment step 62 may comprise X-Ray scanning the assembly to obtain 2-dimensional image data of the assembly and generating a 3-dimensional image of the assembly using a processor and a geometry processing tool such as a computer tomography application to digitally geometry process the 3-dimensional image. In other embodiments step 62 may utilize varying scanning devices or methods. In other embodiments step 62 may further vary.

In step 64, a 2-dimensional cross-sectional image is generated using the processor for a section of the 3-dimensional image. In one embodiment step 64 may comprise the section of the 3-dimensional image of the assembly being selected to correspond to digital model assembly data stored in memory, in electronic communication with the processor, which includes nominal dimensions and tolerances for one or more features of the assembly. Nominal dimensions are defined herein to comprise a target for design specifications. Tolerances are defined herein to be an allowance above or below the nominal dimensions. In other embodiments step 64 may vary. In step 66, the processor compares the 2-dimensional cross-sectional image to a preferred 2-dimensional cross-sectional image or to preferred dimensions for the 2-dimensional cross-sectional image. In one embodiment step 66 may comprise overlaying the 2-dimensional cross-sectional image with the preferred 2-dimensional cross-sectional image. In one embodiment step 66 may comprise comparing dimensions of one or more features derived or obtained from the 2-dimensional cross-sectional image to digital model assembly data which includes nominal dimensions and tolerances for one or more features of the assembly. In other embodiments step 66 may vary.

In step 68, the processor may determine if the assembly and hence the assembly process is acceptable or unacceptable based on the comparison. In one embodiment step 68 may comprise the processor determining that the assembly and hence the assembly process is acceptable if the 2-dimensional cross-sectional image falls within the tolerances and the processor determining that the assembly and hence the assembly process is unacceptable if the 2-dimensional cross-sectional image falls outside the tolerances. In one embodiment step 68 may comprise the processor determining a process capability index based on dimensions of one or more features derived from 2-dimensional images from one or more assemblies and the nominal dimensions and the tolerances for the one or more features of one or more assemblies to determine that the assembly process is acceptable if the process capability index falls above a predetermined threshold or to determine that the assembly process is unacceptable if the process capability index falls below the predetermined threshold. The process capability index is defined herein as an index which denotes the ability of the process to meet the design specifications for a service or product. In one embodiment a six sigma process capability index may be utilized. Dimensions of one or more features derived from the 2-dimensional cross-sectional images of one or more assemblies may be evaluated relative to the nominal dimensions and tolerances, and may be used to compute a standard of deviation for dimensions derived from one or more assemblies to determine a process capability index for evaluating the process capability of the assembly process. In one embodiment, the processor may be configured to determine whether the assembly process is acceptable based on whether the process capability index, or Cpk value, is above a predetermined threshold. In other exemplary embodiments, the process capability index may measure the potential for the process to generate defective outputs relative to either upper or lower specifications for the process. In one embodiment the process capability index may measure the worst-case scenario for the process.

In one embodiment step 68 may comprise the processor accepting the assembly or the assembly process if the processor determines that the assembly or the assembly process is acceptable and the processor rejecting the assembly or the assembly process if the processor determines that the assembly or the assembly process is unacceptable. In one embodiment step 68 may comprise the processor or programming code communicating corrective action instructions to an output device for modifying the assembly process and/or one or more features of the assembly if the processor determines that the assembly or assembly process is unacceptable so that the modified assembly process produces an assembly which the processor determines to be acceptable. In other embodiments step 68 may vary. In still other embodiments one or more steps of the method 60 may be modified in substance or in order, one or more steps of the method may not be followed, or one or more additional steps may be added.

Figure 5:
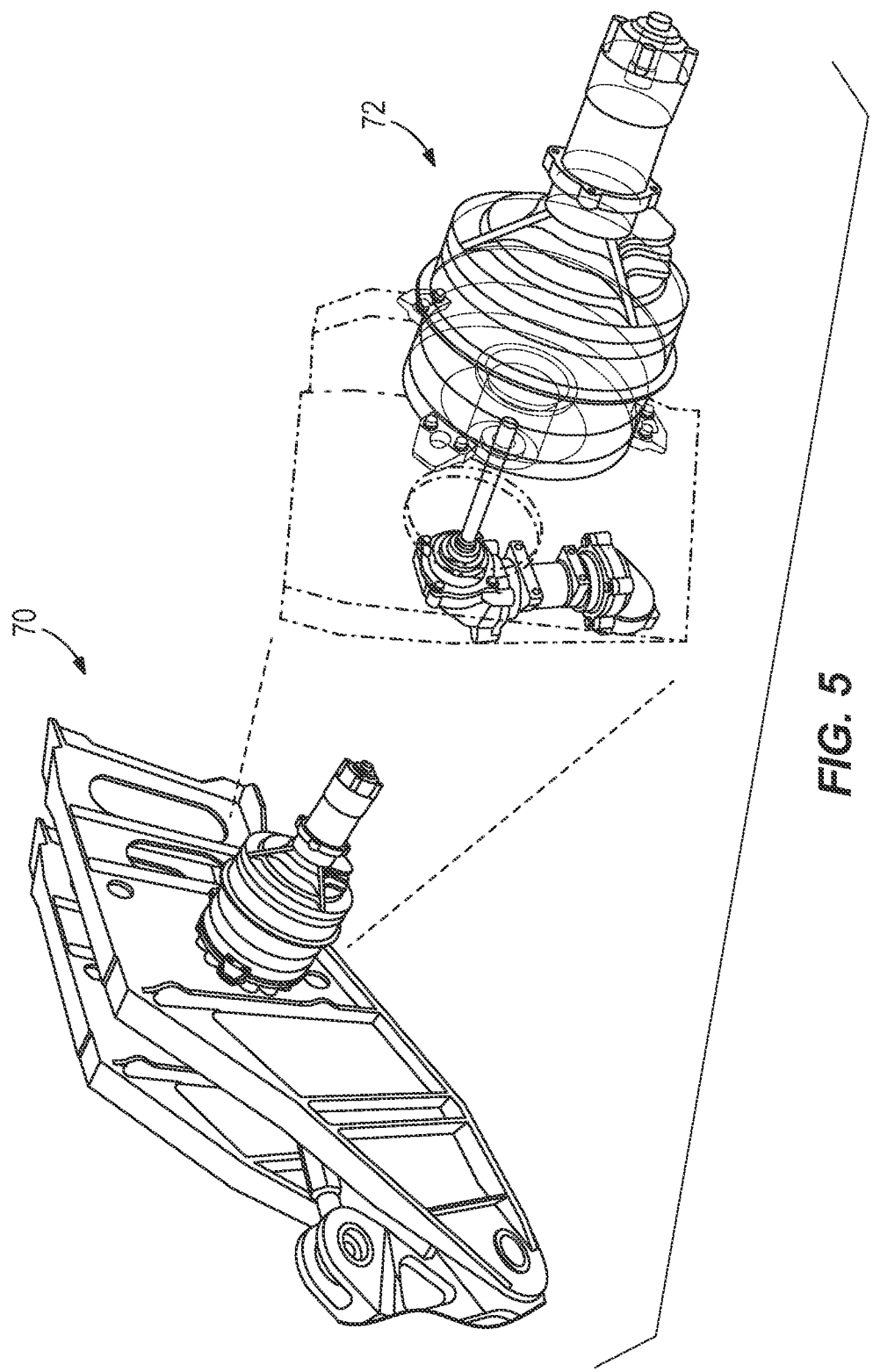
FIG. 5 is an illustration of one embodiment of an assembly in which one or more components of the assembly were scanned by an X-Ray imaging device to acquire 2-dimensional X-Ray image data of the assembly.

FIG. 5 is an illustration of one embodiment of an assembly 70 in which one or more components of the assembly 70 were scanned by an X-Ray imaging device to acquire 2-dimensional X-Ray image data of the assembly 70. A computer tomography application was utilized to generate a 3-dimensional image 72 of the assembly 70 using the 2-dimensional X-Ray image data of the assembly 70. FIG. 5 may utilize any of the systems or methods disclosed herein. In other embodiments varying systems or methods may be used.

Figure 6:
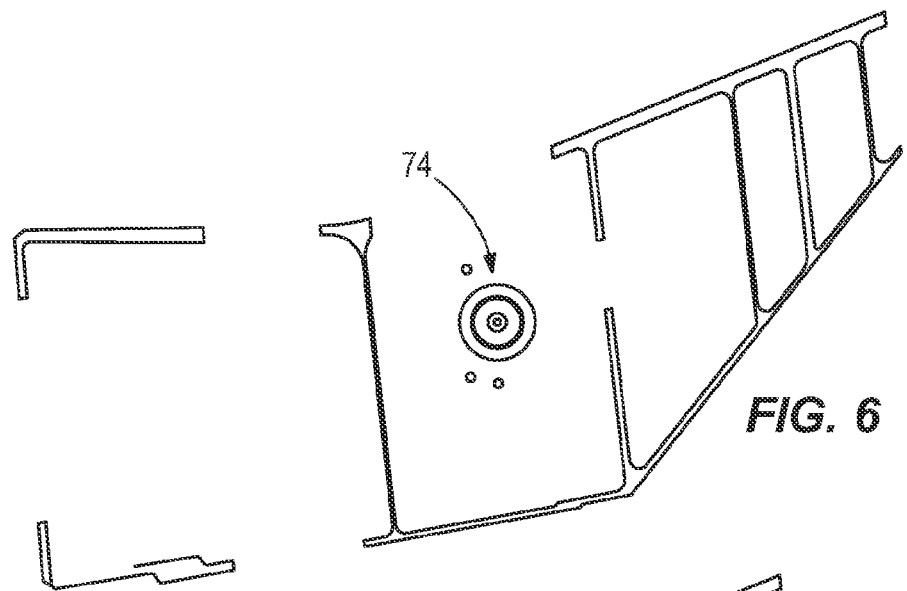
FIG. 6 is an illustration of one embodiment of a 2-dimensional cross-sectional image which was generated for a section of the 3-dimensional image of the assembly of FIG. 5.

FIG. 6 is an illustration of one embodiment of a 2-dimensional cross-sectional image 74 which was generated for a section of the 3-dimensional image 72 of the assembly 70 of FIG. 5. FIG. 6 may utilize any of the systems or methods disclosed herein. In other embodiments varying systems or methods may be used.

Figure 7:
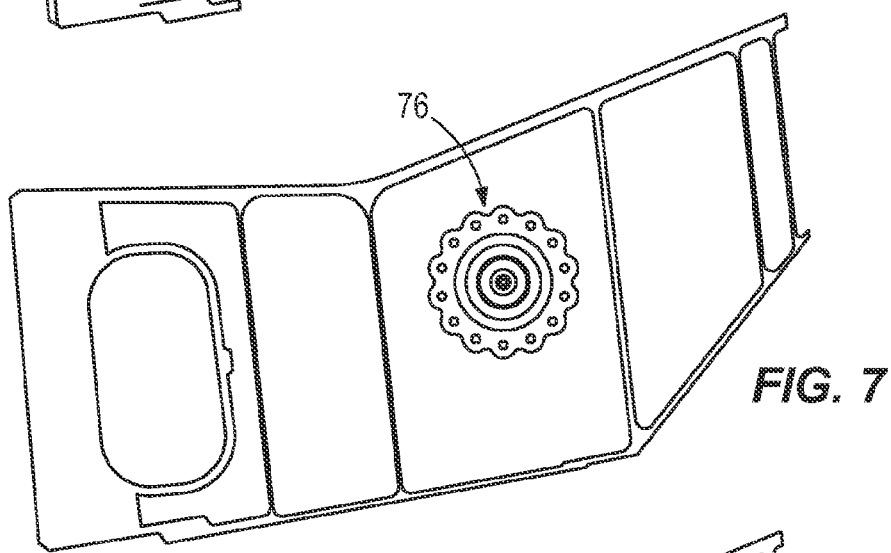
FIG. 7 is an illustration of one embodiment of a preferred 2-dimensional cross-sectional image for the 2-dimensional cross-sectional image of FIG. 6 which was obtained using digital assembly data.

FIG. 7 is an illustration of one embodiment of a preferred 2-dimensional cross-sectional image 76 for the 2-dimensional cross-sectional image 74 of FIG. 6 which was obtained using digital assembly data. This preferred 2-dimensional cross-sectional image 76 may comprise nominal dimensions and tolerances for one or more features of the 2-dimensional cross-sectional image 74 of the assembly 70. Nominal dimensions are defined herein to comprise a target for design specifications. Tolerances are defined herein to be an allowance above or below the nominal dimensions. FIG. 7 may utilize any of the systems or methods disclosed herein. In other embodiments varying systems or methods may be used.

Figure 8:
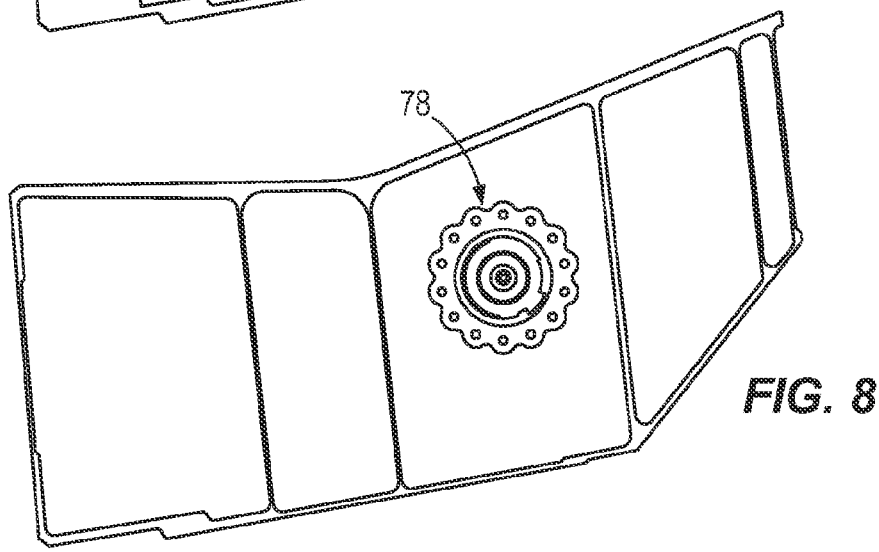
FIG. 8 is an illustration of one embodiment of a comparison or overlay of the 2-dimensional cross-sectional image of FIG. 6 relative to the preferred 2-dimensional cross-sectional image of FIG. 7 in order to determine whether the assembly process of assembling the assembly is acceptable or unacceptable.

FIG. 8 is an illustration of one embodiment of a comparison or overlay 78 of the 2-dimensional cross-sectional image 74 of FIG. 6 relative to the preferred 2-dimensional cross-sectional image 76 of FIG. 7 in order to determine whether the assembly 70 of FIG. 5 or the assembly process of assembling the assembly 70 of FIG. 5 is acceptable or unacceptable. FIG. 8 may utilize any of the systems or methods disclosed herein. In other embodiments varying systems or methods may be used.

One or more embodiments of the disclosure may be more time-efficient, less costly, more accurate, less physically taxing, or may have one or more additional benefits over one or more of the present systems and methods for the inspection of apparatus.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A method for determining whether an assembly process is acceptable, comprising:
X-Ray scanning an assembly to obtain 2-dimensional image data of the assembly;
generating a 3-dimensional image of the assembly using a processor and a geometry processing tool, wherein the geometry processing tool comprises a computer tomography application;
generating, using the processor, a 2-dimensional cross-sectional image for a section of the 3-dimensional image, wherein the section of the 3-dimensional image of the assembly is selected to correspond to digital model assembly data which includes nominal dimensions and tolerances for one or more features of the assembly;
comparing with the processor the 2-dimensional cross-sectional image to the digital model assembly data; and
determining with the processor a process capability index based on the nominal dimensions and the tolerances to determine that the assembly process is acceptable if the process capability index is above a pre-determined threshold or that the assembly process is unacceptable if the process capability index is below the predetermined threshold.

2. The method of claim 1 wherein the comparing with the processor the 2-dimensional cross-sectional image comprises overlaying the 2-dimensional cross-sectional image with a preferred 2-dimensional cross-sectional image.

3. The method of claim 1 further comprising modifying a method of manufacturing the assembly if the assembly process is determined to be unacceptable so that the modified manufacturing method produces an acceptable assembly process.

4. A system for determining whether an assembly process is acceptable, comprising:
an X-Ray imaging device configured to acquire 2-dimensional image data of an assembly;
a processor in electronic communication with the X-Ray imaging device;
a memory in electronic communication with the processor, wherein the memory comprises a computer tomography application executable by the processor to generate a 3-dimensional image of the assembly based on the 2-dimensional image data from the X-Ray imaging device, and programming code executable by the processor to generate a 2-dimensional cross-sectional image for a section of the 3-dimensional image of the assembly, wherein the section of the 3-dimensional image of the assembly is selected to correspond to digital model assembly data stored in the memory which includes nominal dimensions and tolerances; the programming code being further configured to compare the 2-dimensional cross-sectional image to a preferred 2-dimensional cross-sectional image or to preferred dimensions for the 2-dimensional cross-sectional image, and to determine a process capability index based on the nominal dimensions and the tolerances to determine whether the assembly process is acceptable based on whether the process capability index is above a predetermined threshold.

5. The system of claim 4 wherein the programming code is configured to compare the 2-dimensional cross-sectional image to digital model assembly data stored in the memory which includes the nominal dimensions and the tolerances.

6. The system of claim 4 wherein the programming code is configured to determine that the assembly is acceptable if the 2-dimensional cross-sectional image falls within the tolerances and to determine that the assembly is unacceptable if the 2-dimensional cross-sectional image falls outside the tolerances.

7. The system of claim 4 wherein the programming code is configured to overlay the 2-dimensional cross-sectional image with the preferred 2-dimensional cross-sectional image that includes the nominal dimensions and the tolerances for one or more features of the assembly.

8. A system for determining whether an assembly process is acceptable, comprising:
an X-Ray imaging device configured to acquire 2-dimensional image data of an assembly;
a processor in electronic communication with the X-Ray imaging device;
a memory in electronic communication with the processor, wherein the memory comprises a computer tomography application executable by the processor to generate a 3-dimensional image of the assembly based on the 2-dimensional image data from the X-Ray imaging device, and programming code executable by the processor to generate a 2-dimensional cross-sectional image for a section of the 3-dimensional image of the assembly, wherein the section of the 3-dimensional image of the assembly is selected to correspond to digital model assembly data stored in the memory that includes nominal dimensions and tolerances;
the programming code being further configured to:
compare the 2-dimensional cross-sectional image to a preferred 2-dimensional cross-sectional image or to preferred dimensions for the 2-dimensional cross-sectional image; and
determine a process capability index based on dimensions of one or more features derived from 2-dimensional cross-sectional images of one or more assemblies and the nominal dimensions and the tolerances for the one or more features of the one or more assemblies, to determine whether the assembly process is acceptable based on whether the process capability index is above a predetermined threshold.

9. The system of claim 8, wherein the processor is further configured to communicate corrective action instructions to an output device for modifying the assembly process or dimensions of one or more features of the one or more assemblies to correct the assembly process to cause the process capability index to exceed the predetermined threshold.

10. The method of claim 1, further comprising using the processor to communicate corrective action instructions to an output device for modifying the assembly process upon determining that the assembly process is unacceptable.

11. The system of claim 4, wherein the programming code is further configured to communicate corrective action instructions to an output device for modifying the assembly process upon determining that the assembly process is unacceptable.

* * * * *